— 3,441,725
Patented Apr. 29, 1969

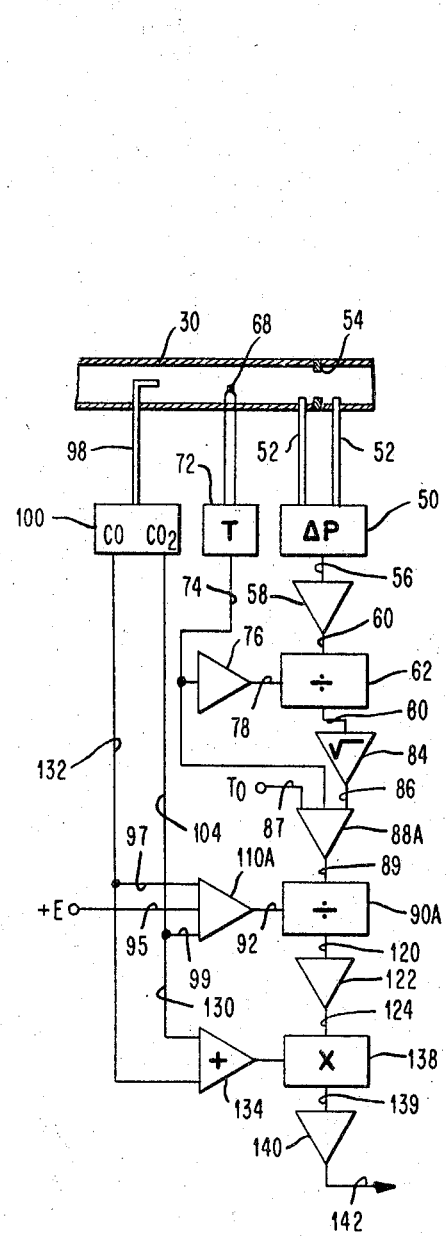
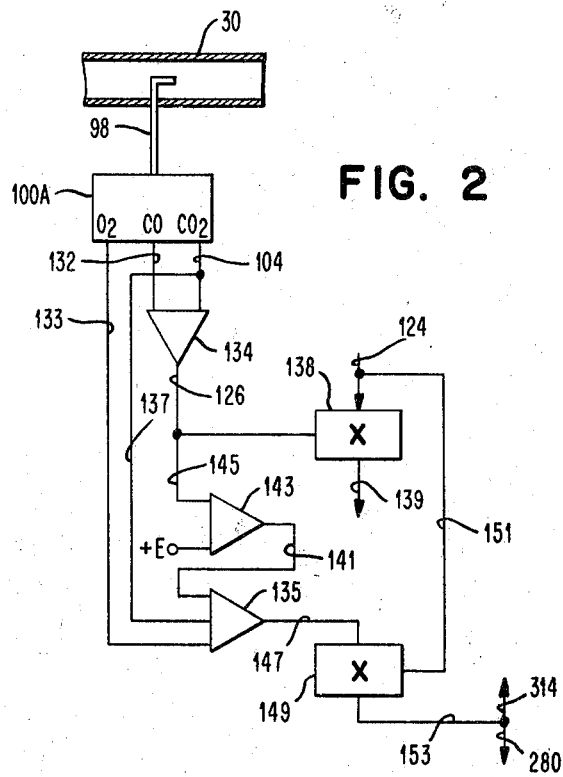
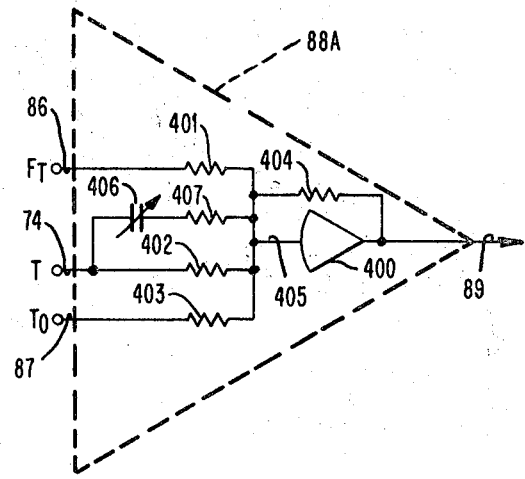
FIG. 2
FIG. 3
FIG. 4

3,441,725
PROCESS MEASUREMENT SYSTEM FOR BASIC OXYGEN REFINING OF STEEL
Bernard Blum, Kenmore, N.Y., James R. Gowen, Laronge, Saskatchewan, Canada, and John W. Schwartzenberg, Maple Glen, Pa., assignors to Leeds & Northrup Company, Philadelphia, Pa., a corporation of Pennsylvania
Filed Mar. 30, 1965, Ser. No. 444,014
Int. Cl. G06g 7/48
U.S. Cl. 235—193                    8 Claims

ABSTRACT OF THE DISCLOSURE

In an oxygen blown steel refining process a heat balance is calculated by integrating signals representing the heat losses from the process and the heat gains and then dividing the integrated difference between the two by the bath weight to produce a signal representing the bath temperature. The rate of slag formation is also calculated and integrated to obtain an indication of the amount of slag with the rate being determined from the carbon loss rate and the oxygen flow rate.

---

This invention relates to the measurement of process variables on the oxygen refining of metals and more particularly to analog computation means for determining certain process variables indirectly by inference from measurements in the exhaust gas recovery system of the process and in the oxygen supply system of the process.

The process of refining pig iron to produce steel with which the present invention is concerned is that which is frequently known as the basic oxygen process. This process utilizes a refining vessel or furnace in which a charge of molten pig iron and scrap is refined by the introduction of high purity oxygen in a high velocity stream impinging upon the surface of the molten metal. In this process the high purity oxygen combines with the impurity elements such as carbon, manganese, phosphorous, sulphur, silicon as well as the iron itself. By the process of this combination the oxides of these impurity elements are formed. The oxides of carbon are evolved as gases while other of the oxides are retained in a slag cover over the molten metal. It is usually desired that the refining process be continued until the content of the several impurities is reduced to a particular predetermined level. Carbon is usually the impurity which is of most importance and consequently the percentage of carbon in the molten metal is usually the factor which determines when the process has been completed.

It has been found that the measurement of the various important process variables is more difficult in the basic oxygen process than in other steel refining processes, such as the open hearth process. These difficulties result from the great rapidity with which the refining process is carried out, the shape and position of the vessel, as well as the extreme heat generated by the process and the turbulence of the reactions produced. Difficulties arise in attempting to make the usual type of direct temperature measurement in the steel bath itself. In addition there is not sufficient time to use the more common systems for analyzing for the impurities by periodic chemical or spectrographic analysis of samples drawn from the refining vessel. Other methods therefore are needed to obtain an indication of these important process variables.

Since the introduction on a wide scale of the basic oxygen refining process many attempts have been made to directly measure the various process variables which are required for guidance of the operator. To a large degree the direct methods of measurement have not met with success and much of the present day operation of this refining process is carried on with insufficient information for the guidance of the operator with a consequent increase in expense.

It is therefore an object of this invention to provide means for indirectly measuring the more important process variables in the basic oxygen refining process.

More particularly it is an object of the present invention to provide an analog computing equipment for indirectly and inferentially determining the bath temperature.

It is another object of this invention to provide a means for continuously comparing the heat gained by the steel bath with the heat lost so that the temperature of the steel bath may be continuously determined.

A further object of this invention is the provision of means for compensating an inferential temperature measurement of the steel bath in accordance with that heat of reaction from the combination of oxygen with impurities other than carbon which is liberated away from the region of the bath.

It is a further object of this invention to provide a means for compensating a bath temperature determination for the amount of carbon dioxide produced in the region of the bath.

In carrying out the above objects the present invention, in one form, utilizes means for producing a signal indicative of the flow of exhaust gases from the refining process. That signal is modified by multiplying by a correction signal indicative of the ratio of the dry gas to the wet gas in the exhaust gas system of the process. The signal resulting from the multiplication of the gas flow signal and the ratio signal is also multiplied by a signal indicative of the mols of carbon per mol of dry gas in the exhaust system of the process as obtained by a continuous analysis of the exhaust gases. The result of this latter multiplication provides a signal indicative of the carbon-loss for the entire molten metal bath.

The novel computer system may also include an analog computation means for producing a signal representative of the flow of high purity oxygen into the process. This flow is compared with the carbon-loss rate for the entire bath to obtain a slag rate signal which is then integrated to establish a signal representative of the amount of slag being formed.

Further, in accordance with this invention there is provided an analog computation of the bath temperature. This is accomplished by an analog comparison of the heat losses from the system and the heat gained during the refining process. This computation apparatus utilizes the carbon-loss rate signal to indicate the heat of reaction produced by the combination of carbon with oxygen in the vicinity of the bath. There is also introduced a signal which is a predetermined fractional part of the slag-rate signal. The slag-rate signal is indicative of the heat of reaction due to the combination of iron and the impurities other than the carbon with oxygen. The particular fraction which is utilized is representative of that portion of the heat of reaction which is occurring in the region of the metal bath.

These signals are compared with the sum of a signal indicative of the latent heat lost in the exhaust gases, which signal is obtained as a fractional part of the carbon-loss rate signal, and a vessel-loss signal indicative of the heat which is lost by radiations from the vessel mouth and through the vessel itself. The results of the comparison are integrated and the resulting signal divided by the sum of the metallic weight and slag weight to obtain the bath temperature.

In U.S. patent application Ser. No. 443,941, filed Mar. 30, 1965, B. Blum and J. W. Schwartzenberg have claimed those novel aspects of the present disclosure which are not claimed herein.

For a more detailed understanding of the invention and for an illustration of a preferred form thereof, reference is made to the drawings in which:

FIG. 2 is a partial block diagram of a modification of FIG. 1.

FIG. 3 is a partial block diagram of another modification of FIG. 1.

FIG. 4 is a circuit diagram showing the input circuit for one of the amplifiers of FIG. 3.

Figure 1:
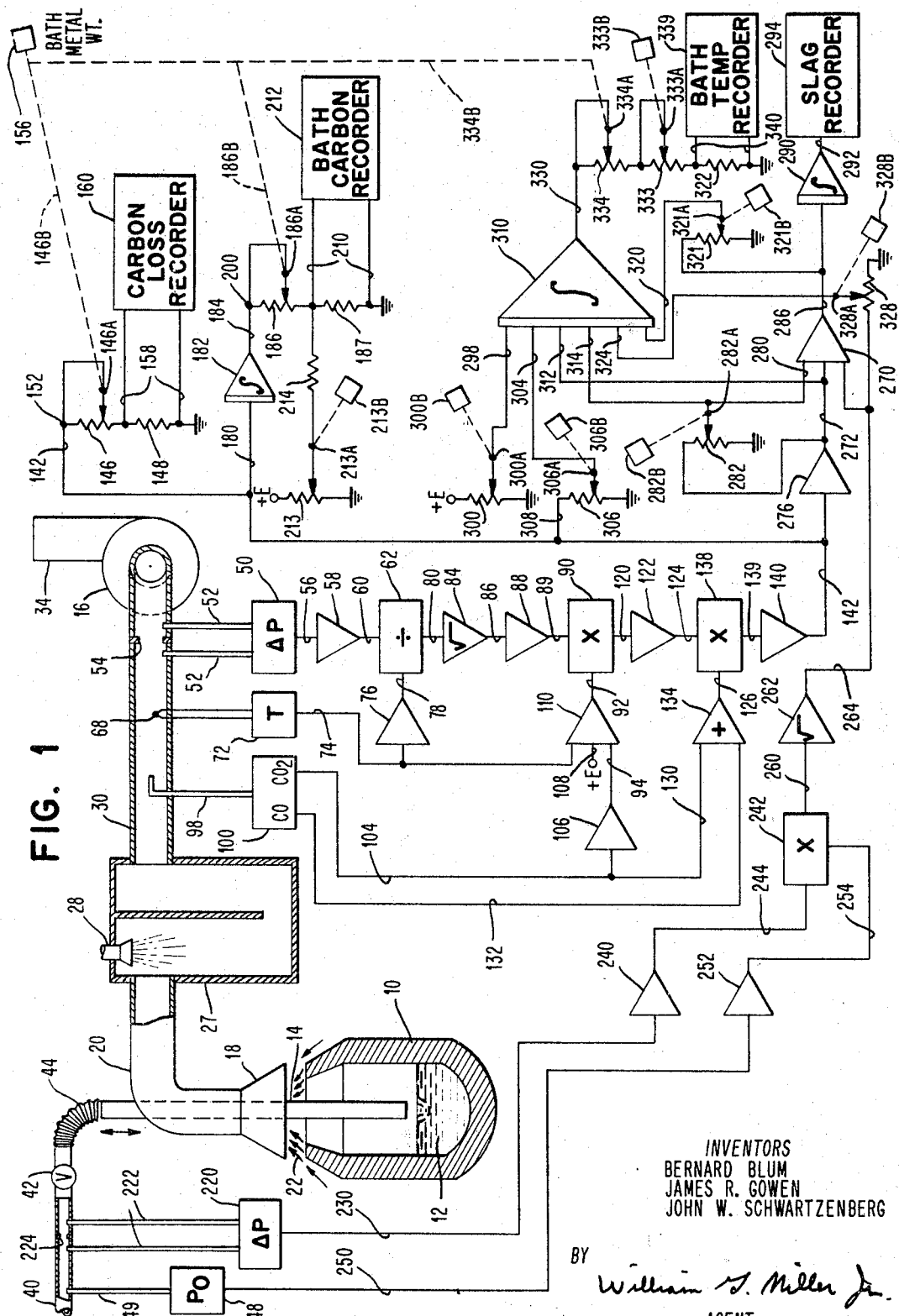
FIG. 1 is a diagrammatic showing of a preferred analog computation circuit for carrying out the objects of this invention.

With reference to FIG. 1 the refining vessel 10 serves as a furnace for containing the molten metal bath 12. During the refining process high purity oxygen is introduced through a lance 14 at a high velocity so as to impinge upon the surface of the bath 12. The resulting refining process produces carbon monoxide and a small amount of carbon dioxide gas in the region of the metal bath 12. These gases are drawn off by a draft induced by a fan 16 into the gas recovery system by way of hood 18 and the exhaust duct 20. As the gases leave the vessel 10 and enter the hood 18 there is induced a flow of air from outside of the vessel 10 as indicated by the arrows 22. The air so induced combines with the carbon monoxide to produce more carbon dioxide thus leaving only a small amount of carbon monoxide in the exhaust gases in the usual refining process. In some refining processes, however, the hood 18 is arranged to have a closer coupling with the refining vessel 10. That arrangement minimizes the induction of air from the outside and results in a greater percentage of carbon monoxide being present in the exhaust gases.

The exhaust gases coming from the pipe 20 are introduced into a spark box 27 which is provided with a water spray nozzle 28 from which there is continually sprayed cooling water. The spark box serves not only as a means for cooling the exhaust gases but also as a means for removing a considerable amount of the solid material contained in the exhaust gases. Provisions, not shown, are usually made for the entrapment of the solid material so as to maintain the exhaust gases as clean as possible.

It should be recognized that in the usual installation the hood 18 and the exhaust duct 20 must of necessity be water cooled because of the extremely high temperatures of the gases evolved from the refining process. After the gases have been further cooled by the water spray from nozzle 28 they are introduced into exhaust duct 30 from which the fan 16 draws them into the stack 34.

As will be evident from FIG. 1 the high purity oxygen is introduced into the refining process by way of pipe 40 through valve 42 and the connected flexible piping 44 and lance 14. In the usual refining process, lance 14 is arranged to be movable so that it may be positioned to have its open end either closer or further away from the surface of the bath 12 as may be necessary for proper operation of the refining process.

The lance position is usually controlled by the operators of the process in accordance wtih the magnitudes of the various process variables, the measurement of which the present invention is concerned. It is thus necessary for these measurements to be as accurate as possible both for the proper positioning of the lance 14 during various phases of the refining process and to determine the time when it is proper to tap the charge in the furnace to obtain a desired tapping temperature and the desired carbon content in the refined steel.

As previously mentioned the extremely difficult conditions presented by this process make it necessary that process variables be measured by indirect means as by inferring their magnitudes from the magnitudes of other more easily measured variables. In this connection the exhaust gases at a point after the water spray are a source of a portion of the information used to make the necessary inferential measurements. Therefore, there is provided a means for measuring the flow of exhaust gases in duct 30. This means is shown in the FIG. 1 as the differential pressure measuring apparatus 50 which is connected by taps 52 across a source of pressure drop in the exhaust duct 30, shown schematically in the figure as an orifice plate 54.

The differential pressure instrument 50 provides at output line 56 a signal indicative of the pressure drop across the orifice plate 54. The signal on line 56 is then amplified by isolating amplifier 58 to provide an input on line 60 to a dividing network shown as block 62.

The dividing network 62 is utilized for the introduction of a temperature compensation for the flow measurement. In this connection there is provided a thermocouple 68 as a primary element for the temperature measurement by temperature measuring instrument 72. The temperature measuring instrument 72 then produces on its output line 74 a signal representative of the temperature of the exhaust gases in the region in which the differential pressure measurement is made by the instrument 50. This temperature representing signal on line 74 is introduced through isolating amplifier 76 as another input on line 78 to dividing network 62.

As a result of the division carried out by the network 62 a signal is provided at the output of the dividing network 62, namely at line 80. That signal is then introduced into a square root extracting network, shown as amplifier 84. The output of amplifier 84 is then introduced by way of line 86 into a sign changing amplifier 88 which in turn produces on line 89 one of the inputs to the multiplying network 90.

The other signal input to network 90 is by way of line 92, the source for which will now be explained.

It is necesasry to correct for the amount of water vapor in the exhaust gases since the gas analysis, to be described later, is generally on the basis of the concentrations in a dried sample of the exhaust gases. This correction is effectively a correction for the amount of water vapor introduced into the exhaust gases by the water spray 28 and can be determined by comparing the temperature of the exhaust gases and the rate of production of carbon dioxide by the refining process. It will be evident that an increased production of carbon dioxide would be indicative of an increased release of heat by the metal bath 12 which would in turn cause more water vapor to be evaporated from the water sprayed into the spark box 27. On the other hand a temperature increase in the exhaust gases would be indicative of a decrease in the amount of water vapor being evaporated if that increase is not accompanied by a corresponding increase in the carbon dioxide produced in the refining process. It is thus possible to obtain an inferential indication of the moisture content of the exhaust gases in duct 30 at a point after the water spray by utilizing the signal on line 74, which is representative of the temperature in that duct, and a signal on line 94 indicative of the concentration of carbon dioxide in the gases in duct 30 as a result of the refining process.

The signal on line 94 may be produced in a well known manner, namely, by the use of infrared gas analysis equipment. This gas analysis equipment draws a sample from the exhaust duct 30 through sample line 98 into the gas sampler 100. In gas sampler 100 the gas is analyzed not only for the percentage of carbon dioxide present but also for the percentage of carbon monoxide present in terms of mols of gas per mol of dry exhaust gas. There is therefore produced two outputs from analyzer 100. The signal on output line 104 is indicative of the percentage of carbon dioxide in the exhaust gases on a dry gas basis; this signal has its sign changed by the changing amplifier 106 which produces the signal on line 94.

There is also required for the inferential water vapor indication a signal which will represent unity. This signal is provided on line 108 from a constant potential source +E. The lines 74, 108 and 94 are input lines to operational amplifier 110 which is effective to compare the signal on line 74 with the sum of the signals on line 94 and line 108. It will be obvious to those skilled in the art that the necessary constants may be introduced by the appropriate selection of input resistance values for amplifier 110 for the several inputs from lines 74, 94 and 108. The output of amplifier 110 on line 92 is therefore a signal representing the ratio of the amount of dry gas in the exhaust gases to the amount of wet gas in the exhaust gases. The amount of wet gas is considered to be the amount of dry gas plus the amount of water vapor in the exhaust gases.

As mentioned previously, the signal from lines 89 and 92 are multiplied by the multiplying network 90 to produce on output line 120 a signal indicative of the flow of dry gas in the exhaust duct 30. The signal on line 120 is amplified by amplifier 122 which may be a noninverting type of amplifier so as to produce on line 124 the amplified signal representative of the mols of dry gas being exhausted from the process.

The multiplication of the signals on lines 89 and 92 may be eliminated in those cases where the analyzer 100 and its sample line 98 are constructed to maintain the exhaust gases above their dew point. In such a case the gas analysis would be on the basis of wet gases and compensation for water vapor would not be necessary.

In order to determine from measurements of the exhaust gases from the refining process the rate at which carbon is being lost by the bath 12, it is necessary to multiply the signal on line 124 by a signal introduced on line 126, indicative of the mols of carbon which are being lost by the bath 12 per mol of dry gas in the exhaust system.

The signal on line 126 is obtained by summing the signal on line 130, which is the same signal as the signal on line 104, with the signal on line 132, which as shown in the figure is one of the outputs of the gas analyzer 100 and is indicative of the percentage concentration of carbon monoxide in the exhaust gases on a dry gas basis. The signals from lines 130 and 132 are introduced as inputs into operational amplifier 134. This amplifier by summing its inputs then produces an output signal on line 126 indicative of the concentration of carbon in the exhaust gases on a dry gas basis.

The signals from lines 124 and 126 are multiplied by the multiplying network 138 to produce on its output line 139 a signal which by way of amplifier 140 provides a signal on line 142 representative of the carbon loss rate for the entire bath 12 of the refining process.

In order to convert the signal on line 142 to the percentage of carbon lost per minute in the bath 12, the signal on line 142 is introduced into a voltage divider comprising series coupled resistors 146 and 148 which connect line 142 to ground. The resistor 146 is a variable resistor having a tap 146A connected to its upper terminal 152. The position of the tap is adjusted through the mechanical coupling 146B by knob 156 so as to provide a voltage division in accordance with the bath metal weight. The output from the voltage divider is taken from lines 158 which are connected to opposite sides of resistor 148 and which connect to a carbon-loss recorder 160 which records continuously the carbon-loss rate from the bath 12 in terms of percent per minute.

The signal on line 142 is also utilized to provide an indication of the percent of carbon remaining in the bath 12. Thus, the signal from line 142 is introduced through line 180 as an input to integrating amplifier 182 whose output on line 184 is introduced into a voltage divider network consisting of resistors 186 and 187. The resistor 186 is constructed similar to the resistor 146 in that it has a variable tap 186A which is connected to its upper terminal 200. The variable tap 186A is positioned by the mechanical coupling 186B which is connected to the adjustable knob 156 in the same manner as is the mechanical coupling 146B. Thus the variable tap 186A is adjusted at the same time variable tap 146A is adjusted. As a consequence of the voltage division in accordance with the metal bath weight there is obtained on the lines 210 which are connected to opposite sides of resistor 187 a potential, which is a measure of the total carbon lost by the bath 12. To obtain a measure of the remaining bath carbon percentage on recorder 212 which is connected to lines 210 it is necessary to introduce the percent carbon at the start of the process as a constant from which the percentage of carbon lost may be subtracted. For this purpose resistor 213 is connected at one end to potential source +E and at its other end to ground. The adjustable tap 213A is positioned by mechanically coupled knob 213B to a position which will provide a potential at tap 213A representative of the percentage carbon in bath 12 at the start of the process. Tap 213A is connected by way of resistor 214 to the junction between resistors 186 and 187. The currents in resistor 187 due to the signal on line 184 and the potential at tap 213A then subtract and recorder 212 records the percentage carbon remaining in bath 12.

In addition to having an indication of the rate of carbon loss as well as the percent carbon remaining in the metal bath 12 it is important that the operator also be cognizant during the refining process of the amount of slag which is being formed on top of the metal bath 12. It is sometimes necessary for him to regulate the refining process so as to either increase or decrease the rate of slag formation, both for maintaining the desired reaction rates in the refining process as well as for the protection of the lance 14 from the excessive heat generated by the refining process. To provide an indication of the slag accumulating during the refining process it is necessary to make an indirect and inferential measurement of this important process variable. In the present arrangement this inferential measurement is derived from a comparison of the flow of oxygen in the lance 14 with the amount of oxygen being consumed in production of carbon monoxide and carbon dioxide. This approach to measuring the slag formation on bath 12 is based on the assumption that the oxygen which does not go into the making up carbon monoxide and carbon dioxide does go into producing the oxides of the other impurity elements, which instead of being given off as a gas go into the formation of slag.

To obtain such an inferential measurement it is necessary to measure the rate of flow of high purity oxygen in pipe 40. There is thus provided a differential pressure measuring instrument 220 which is connected by the two taps 222 to opposite sides of a flow restricting device shown here as a restricting orifice plate 224. The differential pressure measuring instrument 220 provides an output on line 230 indicative of the pressure drop across orifice plate 224. The signal on line 230 is introduced through amplifier 240 to multiplying network 242 by way of line 244.

In addition to the differential pressure measurement a static pressure measurement is also made. This measurement is provided by static pressure measuring instrument 248 which is connected by way of tap 249 to pipe 40 so as to provide a static pressure measurement giving a signal on line 250 indicative of the static pressure in pipe 40. The signal on line 250 is then introduced through amplifier 252 to multiplying network 242 by way of line 254.

Both amplifiers 240 and 252 serve to provide electrical isolation for the inputs to the multiplying network 242 shown as a block in the figure. By multiplication of the inputs on lines 244 and 254 the network 242 provides an output signal on line 260 which is then introduced into the square root extracting network 262, shown as an amplifier, and there is then provided a signal on line 264 indicative of the flow of high purity oxygen in the lance 14. This calculation is in accordance with the well known approach to measuring flow, namely, by taking the square root of the product of the static pressure and the differential pressure across a restriction and dividing the result and by the square root of the absolute temperature. In this particular application the absolute temperature is not variable to any significant extent and that quantity is therefore ignored in this measurement. We may, therefore, consider that the signal on line 264 is representative of the mols of oxygen per second which are provided to furnace 10 by the adjustment of valve 42.

The signal on line 264 then provides one of the inputs to operational amplifier 270. One of the other inputs to operational amplifier 270 is by way of line 272. The signal on line 272 is a signal corresponding to that on line 142 except that the sign of the signal has been changed by the intervening amplifier 276. Thus, the signal on line 272 can be considered as representing the amount of carbon monoxide which is produced in the furnace 10 in the region of the bath 12. It is characteristic of the basic oxygen process that the combination of carbon with the oxygen introduced produces in the region of the bath mostly carbon monoxide with small amounts of carbon dioxide.

Since it takes only one mol of oxygen to make two mols of carbon monoxide multiplying factors are introduced in amplifier 270 so that the input from line 264 is effectively multiplied by two while the input from line 272 is effectively multiplied by unity.

In addition to the inputs from lines 264 and 272 amplifier 270 has as a third input the signal on line 280. This signal is derived from the signal on line 272 by way of a variable tapped resistor 282 whose variable tap 282A is adjusted by knob 282B so that the signal on line 280 represents a fixed preset value for the extra amount of oxygen which is combined with carbon in the region of the bath to make the small amount of $CO_2$ which is present in that region. There will thus be utilized in the input circuit of amplifier 270 a multiplying factor for the input from line 280 which will represent unity, for it is only necessary to add a half mol of oxygen to convert carbon monoxide into carbon dioxide. If desired the signal for line 280 may be continuously calculated from measured process variables and applied to line 280 in the manner later described in connection with FIG. 2.

The output of amplifier 270 on line 286 is representative of the amount of oxygen supplied through lance 14 which did not go into making up carbon monoxide or carbon dioxide, for the signal on line 264 is opposite in sign compared with the signals on lines 272 and 280. The operation performed by the amplifier 270 is thus one of subtraction.

The signal on line 286 provides an input, indicative of the rate of slag formation, to integrating amplifier 290 which serves to provide on its output line 292 to the slag recorder 294 a signal indicative of the accumulated slag which is produced on the surface of bath 12. As shown in FIG. 1 and described above, the magnitude established for the signal on line 292 represents a rough approximation of the amount of slag which is formed in that the amount of the different constituent oxides of the several impurities which go to make up the slag which is formed for each mol of oxygen varies slightly from one impurity to the other. However, those impurities which make up the majority of the content of the slag are made in roughly the same proportion and therefore the approach herein described is a suitable way of giving the operator of the process an indication of the slag produced. This indication is sufficiently accurate for the operational requirements which must be met in this refining process.

In addition to providing an indication of the carbon losses, the bath carbon content and the amount of slag which is being produced in the refining process, it is important that the operator also have available an indication of the temperature of the bath 12 in order that he may tap the vessel 10 when the bath is at the optimum tapping temperature. It is not usually necessary that the bath temperature be continuously recorded with accuracy throughout the refining process but it is necessary that this quantity be indicated with reasonable accuracy when the process has approached the final stages. Thus, the bath temperature recorder may be calibrated whenever the vessel 10 is turned down prior to the completion of the refining process. Such a turndown operation is usually necessary for several other important measurements and it is common practice at that time to insert into the bath 12 a thermocouple measuring device such as the presently used disposable type of thermocouple which will give a fast and accurate indication of the actual temperature of the bath 12. Having obtained an accurate measure of the bath temperature by such means the temperature recorder may be calibrated so that any further change in its input signal as hereinafter described will maintain the recorded indication at an accurate value.

To obtain the necessary indication of changes in bath temperature from the time when the bath temperature recorder is calibrated after the last turndown of the vessel 10, it has been found desirable to compute by analog means a heat balance for the bath 12 itself. This heat balance consists of a comparison of the signals which represent heat losses with those signals which represent a heat gain for the metal bath. The manner in which this calculation is carried out will be more evident from the following description of the detailed circuitry for carrying out this particular analog computation.

The heat losses from the metal bath are represented by two signals. One is introduced on line 298 as a preadjusted value determined by the positioning of tap 300A on the adjustable resistor 300 by the manual setting of knob 300B. The resistor 300 is connected at one terminal to a voltage source $+E$ and at the other terminal to a ground connection. The signal on line 298 is adjusted to represent the vessel losses, that is the heat lost from the vessel 10 by radiation and conduction. This value is of a fairly constant magnitude and can usually be represented by a preset adjustment.

The other loss which is taken into account is the exhaust losses, that is the losses from the process due to the heat which is carried by the exhaust gases as they are exhausted through the gas recovery system. A signal representing the exhaust losses is provided on line 304 which is connected to the variable tap 306A of resistor 306 adjusted by knob 306B. One end of the resistor 306 is connected by way of line 308 to line 142 while the other side of resistor 306 is connected to a ground connection. There is thus produced on line 304 a fractional portion of the signal appearing on line 142. This fractional portion is adjusted by the manual knob 306B to be a portion representing the sensible heat lost in the exhaust gases as latent heat of the carbon monoxide and carbon dioxide in those gases and also takes into account the change in the effect of the heat losses on the temperature of the bath due to changes in the weight of the bath itself.

Both the signal on line 298 and the signal on line 304 are introduced as inputs to the integrating amplifier 310. The sum of these two signals is compared with the sum of the other signals introduced into amplifier 310. Those other signals include the various signals representing the heat gain of the bath 12 due to the heat of reaction produced by the several chemical reactions in the refining process. More particularly the heat of reaction due to the production of carbon monoxide at the region of the bath is introduced as a signal on line 312 which signal is derived directly from line 272.

In order to modify the heat balance to take into account the small amount of carbon dioxide which is produced in the region of the bath another signal is introduced as an input to amplifier 310 on line 314. This signal is obtained by connecting line 314 to line 280. The signal on line 280 represents as previously mentioned, the carbon dioxide which is produced at the bath.

That portion of the heat of reaction affecting bath temperature, which is due to the combination of oxygen with the impurity elements that go to make up the slag, is introduced by way of line 320 and line 324. The signal on line 320 is obtained from the variable tap 321A on resistor 321 in accordance with its adjustment by knob 321B. The resistor 321 is connected at one end to line 286 and at the other end to a ground connection. Thus, the signal on line 320 is a fractional portion of the signal appearing on line 286 which signal represents the variable portion of the heat of reaction which affects bath temperature and which is related to the rate of slag formation.

The constant portion of the heat of reaction due to slag formation is introduced into amplifier 310 by way of line 324 as that portion which affects bath temperature. This signal represents a constant amount of iron oxide blown out of the refining system due to the flow of oxygen into the system while the signal on line 320 represents the amount blown out due to other causes. The problem of correcting for the heat of reaction released by formation of the slag has been found by the inventors to introduce these fixed and variable factors which have not previously been taken into account. The correction factor introduced into the signal on line 324 is incorporated in the adjustment provided by the knob 328B, which adjusts the position of the tap 328A on resistor 328. Resistor 328 is connected to have one end coupled to line 264 and its other end coupled to a ground connection.

As previously mentioned, the several signals which are introduced as inputs into amplifier 310, namely, the signals on lines 298, 304, 312, 314, 324 and 320 are compared and integrated by amplifier 310 so as to produce an output on line 330 indicative of the change in heat of the bath 12. In order to convert the signal on line 330 to a signal representing the change in bath temperature it is necessary to introduce both the weight of the metal bath itself as well as the weight of the slag. This is accomplished by the incorporation of a voltage divider across the output line 330. This voltage divider is comprised of a series connection of resistors 332, 333 and 334. The resistors 333 and 334 are so arranged as to have a variable tap which is capable of adjustment to modify the resistance which is inserted in the circuit by these resistors. Thus resistor 334 has a variable tap 334A which is connected to the uppermost terminal of 334 and which is adjusted by means of the mechanical coupling 334B, which is in turn adjusted by knob 156 in accordance with the weight of the metal bath itself. The resistor 333 has a selective portion of its resistance shorted out by the adjustable tap 333A with the adjustment of knob 333B which adjustment is related to the weight of the slag. The input to the bath temperature recorder 339 is then derived from opposite terminals of resistor 332 by way of lines 340.

The particular means which may be used to calibrate the bath temperature recorder 339 are not shown for they may be any of a number of standard well-known means forming a part of the recorder circuit.

FIG. 2 shows the changes which must be made in the circuit of FIG. 1 to provide an alternative means for obtaining a signal for lines 280 and 314. In the circuit of FIG. 1 that signal is a preset value. In some installations it may be desirable to vary the signal in accordance with process conditions. In FIG. 2 the calculation of the carbon dioxide formed at the bath 12 is made from the analysis of the exhaust gases for carbon dioxide, carbon monoxide and oxygen. The equation which mathematically expresses the particular calculation performed in the disclosed circuit is as follows:

$$\frac{CD_e}{F_g} = CD_m + .5313[CD_m + CM_m] - .5313 + 2.5313 X_m \quad (1)$$

where $CD_e$=carbon dioxide evolved from the process,
$CD_m$=carbon dioxide measured in the exhaust gases on a dry gas basis,
$CM_m$=carbon monoxide measured in the exhaust gases on a dry gas basis,
$F_g$=flow rate of the exhaust gases on a dry gas basis,
$X_m$=oxygen measured in the exhaust gases on a dry gas basis, and assuming that the ratio of the volume of oxygen to the volume of air under standard conditions is .2099. This equation is based on the fact that the measured carbon monoxide, carbon dioxide and oxygen provides a means for calculating the nitrogen in the air infiltrated at 22. Knowing that value the infiltrated oxygen is determined and the amount of carbon dioxide produced by the infiltrated air is also determined. The remaining carbon dioxide out of that measured by analyzer 100 is then that which is evolved at the bath 12. This calculation is based on the assumption that all of the oxygen entering through the lance 14 is combined; therefore none enters the exhaust system.

As shown in the FIG. 2 analyzer 100A produces an output signal on line 133 which is indicative of the concentration of oxygen in the exhaust gases, measured on a dry gas basis. That signal provides one input to operational amplifier 135 corresponding to the quantity $X_m$ in the above Equation 1. Another input signal to amplifier 135 is provided by the output from analyzer 100 on line 104 which connects to amplifier 135 by way of line 137 and provides the $CD_m$ term.

A third input to amplifier 135 is from line 141 which is an output line from amplifier 143. Amplifier 143 is an operational amplifier which is effective to subtract the constant term of Equation 1 from the term $$[CD_m + CM_m]$$

The constant term is provided by the input from fixed potential +E while the other term is obtained from line 145 which connects to line 126.

The output of amplifier 135 on line 147 is then equal to the left hand side of Equation 1. Line 147 supplies one input to the multiplying network 149. The other input to 149 is by way of line 151 which connects to line 124. Network 149 therefore multiplies the left hand side of Equation 1 by $F_g$, the flow rate of the exhaust gases after compensation for water vapor content.

The output of network 149 then supplies a signal which is connected by way of line 153 to line 280 and line 314.

The constant and the coefficients of the terms of Equation 1 are provided by the input resistors (not shown) associated with the inputs to operational amplifiers 135 and 143.

The system shown in FIG. 1 for compensating for the water vapor in the exhaust gases is generally adequate in those installations in which the total flow of exhaust gases $F_t$ is not subject to wide variations. In those installations where such variations are found it may be necessary to use a circuit such as that shown in FIG. 3 to provide adequate compensation for the water vapor. In FIG. 3 the portion of FIG. 1 which must be changed to accomplish such a compensation is shown. The remaining portions of FIG. 1 would, of course, remain unchanged.

The manner in which the water vapor correction is introduced in the circuit of FIG. 3 may be expressed by the equation:

$$F_g = \frac{F_t + k_2 T - k_2 T_0}{1 + k_1 C D_m + k_3 C M_m} \quad (2)$$

where $F_t$ = total flow of wet gas in the exhaust system,
T = temperature of the exhaust gases,
$T_0$ = ambient or room temperature.

As a first step in modifying the circuit of FIG. 1 to solve Equation 2 sign changing amplifier 88 of FIG. 1 is changed to operational amplifier 88A of FIG. 3. The inputs to amplifier 88A include the signal on line 86 representating $F_t$ in Equation 2. The input representing $k_2T$ is obtained from line 74 and the other input signal representing $-k_2T_0$ is obtained from line 87 which connects to a source representative of the ambient or room temperature in the process area. The output of amplifier 88A on line 89 is thus representative of the numerator of Equation 2.

The denominator of Equation 2 is established on line 92 as an output signal from operational amplifier 110A. The inputs to amplifier 110A include a signal from a source of potential +E connected to amplifier 110A by line 95 to provide a signal representative of the unity constant in the denominator of Equation 2.

A signal on line 97 which connects to line 132 provides an input signal representative of the term $CM_m$, and the signal on line 99 which is connected to line 104 provides the term $CD_m$ in the denominator of Equation 2. The constants $k_1$ and $k_3$ are supplied by the input resistors in amplifier 110A (not shown).

Division of the signal on line 89 by that on line 92 is carried out by the dividing network 90A produce on line 120 a signal representing the term $F_g$ of Equation 2, the flow of gas in the exhaust system on a dry gas basis. By utilizing the moisture compensation circuit of FIG. 3 it is possible to obtain a reasonably accurate compensation in spite of wide variation which may occur in the exhaust gas flow.

In some systems it is desirable to include in amplifier 88A a rate circuit as shown in detail in FIG. 4. Amplifier 88A is an operational amplifier made up of a high gain amplifier 400 and the associated input circuits and feedback circuit. The input from line 86 is connected to amplifier 400 by resistor 401 whose value represents unity while the inputs from lines 74 and 87 are respectively to input resistors 402 and 403 both of which represent the constant $k_2$ in Equation 2. A feedback resistor 404 is also provided to connect the input line 405 of amplifier 400 to the output line 89.

Resistor 402 as shown in FIG. 4 is shunted by a rate network including variable capacitor 406 in series with resistor 407 both of which serve to introduce a rate factor in the temperature input circuit.

All of the various elements shown symbolically in the systems of several figures are well known elements to those familiar with the analog computation art as well as the process instrumentation art. They have therefore been shown in that form for convenience of understanding and ease of explanation.

It will be understood by those skilled in the measurement art that the several indirect and inferential measurements herein described are by their nature not as accurate as would be a direct type of measurement. However, as previously pointed out, a direct measurement of the quantities with which the present invention is concerned cannot be readily accomplished with the measuring equipment presently available. It has been found that the system herein disclosed can provide adequate accuracy for the type of process with which it is associated. By using equipment of this type it is possible to establish the desired end point for the carbon as well as for the bath temperature so that the bath may be tapped at the proper time with a minimum loss of time in reblowing and with a minimum inconvenience due to the formation of skulls and other difficulties which arise when improper conditions exist at the time of tapping. The measurements such as the carbon-loss rate and the slag indication are of considerable use during the operation of the refining process and enable the operator to obtain a maximum production from the furnace in every-day operation.

What is claimed is:

1. Apparatus for inferentially establishing a signal indicative of the temperature of the molten steel being refined by the introduction of high purity oxygen comprising means for producing a signal indicative of the carbon-loss rate resulting from the combination of carbon from said steel with said high purity oxygen in the region of said molten steel, means for producing from said carbon-loss signal a first signal indicative of the heat released by the reaction of carbon and oxygen, means for producing a slag-rate signal indicative of the rate at which slag is formed by the combination of elements other than carbon from said steel with said oxygen, means for modifying said slag-rate signal to produce a second signal indicative of the amount of heat of reaction released during formation of said slag, compensated for the heat of reaction which is given off by said other elements in areas away from the region of said molten steel, means for producing a third signal representing the sensible heat lost as latent heat of the carbon monoxide and carbon dioxide in the exhaust gases from said refining, said third signal being produced by modifying said carbon-loss signal, means for producing a fourth signal indicative of the heat losses from the refining vessel, means for algebraically summing and integrating said first, second, third and fourth signals, and means for dividing the resulting signal produced by said last named means in accordance with a value representing the weight of molten steel being refined to obtain a signal indicative of the temperature of said molten steel.

2. Apparatus for inferentially establishing a signal indicative of the temperature of the molten steel being refined by the introduction of high purity oxygen comprising means for producing from the measurement of exhaust gas flow and exhaust gas carbon content a signal indicative of the carbon-loss rate resulting from the combination of carbon from said steel with said high purity oxygen in the region of said molten steel, means for producing from said carbon-loss signal a first signal indicative of the heat released by the reaction of carbon and oxygen, means for producing from a measurement of flow of said high purity oxygen and said carbon-loss signal a slag rate signal indicative of the rate at which slag is formed by the combination of elements other than carbon from said steel with said oxygen, means for modifying said slag rate signal to produce a second signal indicative of the amount of heat of reaction released during formation of said slag, compensated for the heat of reaction which is given off by said other elements in areas away from the region of said molten steel, means for producing a third signal representing the heat lost as latent heat of the carbon monoxide and carbon dioxide in the exhaust gases from said refining, said third signal being produced by modifying said carbon-loss signal, means for producing a fourth signal indicative of the heat losses from the refining vessel, means for algebraically summing and integrating said first, second, third and fourth signals, and means for dividing the resulting signal produced by said last named means in accordance with a preset value representing the weight of molten steel and slag in said vessel to obtain a signal indicative of the temperature of said molten steel.

3. An analog computer for determining the temperature of the molten steel bath during a refining process in a basic oxygen furnace comprising means for producing a first signal representative of the carbon-loss rate for said bath in response to measurement of the flow of carbon dioxide in the exhaust gases of said furnace, means for producing from said first signal a second signal representative of the heat of reaction due to the combining of the lost carbon with oxygen in the region of said bath, means for producing from said first signal a third signal representative of the latent heat of the said exhaust gases, means for producing a fourth signal representative of the amount of slag being formed during said refining process, means for producing from said fourth signal a fifth signal indicative of that portion of the heat of reaction due to the formation of the compounds in the slag which is effective to raise the temperature of said bath, means for producing a sixth signal representative of the heat losses in the furnace vessel itself, means for combining and integrating said second, third, fifth and sixth signals so as to obtain a signal representing the heat balance of said bath, and means for determining from said heat balance signal and a preset value for the weight of said bath the temperature of said bath.

4. Apparatus for inferentially establishing a signal indicative of the temperature of molten steel being refined by a process which introduces high purity oxygen comprising means for producing a signal indicative of the differential pressure between two points in the exhaust system of said process said signal being representative of the flow of exhaust gases from said process, means for producing a signal indicative of the temperature of said exhaust gases, means for dividing said differential pressure signal by said temperature signal and extracting the square root of the resultant signal to thereby produce a signal indicative of the total flow of exhaust gases from said process, means for producing a signal indicative of the concentration of carbon dioxide in said exhaust gases on a dry gas basis, means for comparing said temperature signal and said carbon dioxide signal and adding the result of said comparison to a constant value to produce thereby a signal indicative of the ratio of the dry gas to the wet gas in said exhaust system, means for multiplying said total flow signal and said ratio signal to produce a signal indicative of the flow of dry gas in said exhaust system, means for producing a signal indicative of the concentration of carbon monoxide in said exhaust gases on a dry gas basis, means for adding said carbon monoxide signal and said carbon dioxide signal to produce a signal indicative of the concentration of carbon in said exhaust gases, said concentration being with respect to the dry gas in said exhaust system, means for multiplying said dry gas flow signal and said carbon concentration signal to establish a signal indicative of the carbon-loss rate from said process, means for producing a signal indicative of the differential pressure across a restriction in the feed line for the high purity oxygen fed to said process, means for producing a signal indicative of the static pressure in said oxygen feed line, means for multiplying said differential pressure and said static pressure signals for said oxygen line and extracting the square root of the product to establish a signal indicative of the flow of oxygen into said process, means for producing from said carbon-loss rate signal a signal for establishing compensation for the carbon dioxide made in the region of the bath, means for comparing said carbon-loss rate signal and said oxygen flow signal and for modifying the result of said comparison in accordance with said carbon dioxide compensation signal to produce a signal indicative of the slag formation rate for said process, means for producing from said carbon-loss rate signal a first signal indicative of the heat released by the reaction of carbon and oxygen, means for modifying said slag-rate signal to produce a second signal indicative of the amount of heat of reaction released during formation of said slag, compensated for the heat of reaction which is given off by said other elements in areas away from the region of said molten steel, means for producing a third signal representing the sensible heat lost as latent heat of the carbon monoxide and carbon dioxide in the exhaust gases from said refining, said third signal being produced by modifying said carbon-loss signal, means for producing a fourth signal indicative of the heat losses from the refining vessel, means for algebraically summing and integrating said first, second, third and fourth signals, and means for dividing the resulting signal produced by said last named means in accordance with a value representing the weight of molten steel being refined to obtain a signal indicative of the temperature of said molten steel.

5. Apparatus for inferentially establishing a signal indicative of the temperature of molten steel being refined by a process which introduces high purity oxygen comprising means for producing a signal indicative of the differential pressure between two points in the exhaust system of said process said signal being representative of the flow of exhaust gases from said process, means for producing a signal indicative of the temperature of said exhaust gases, means for dividing said differential pressure signal by said temperature signal and extracting the square root of the resultant signal to thereby produce a signal indicative of the total flow of exhaust gases from said process, means for producing a signal indicative of the concentration of carbon dioxide in said exhaust gases, means for producing a signal indicative of the concentration of carbon monoxide in said exhaust gases, means for adding said carbon monoxide signal and said carbon dioxide signal to produce a signal indicative of the concentration of carbon in said exhaust gases, means for multiplying said total gas flow signal and said carbon concentration signal to establish a signal indicative of the carbon-loss rate from said process, means for producing a signal indicative of the differential pressure across a restriction in the feed line for the high purity oxygen fed to said process, means for producing a signal indicative of the static pressure in said oxygen feed line, means for multiplying said differential pressure and said static pressure signals for said oxygen line and extracting the square root of the products to establish a signal indicative of the flow of oxygen into said process.

means for producing from said carbon-loss rate signal a signal for establishing compensation for the carbon dioxide made in the region of the bath, means for comparing said carbon-loss rate signal and said oxygen flow signal and for modifying the result of said comparison in accordance with said carbon dioxide compensation signal to produce a signal indicative of the slag formation rate for said process, means for producing from said carbon-loss signal a first signal indicative of the heat released by the reaction of carbon and oxygen, means for modifying said slag-rate signal to produce a second signal indicative of the amount of heat of reaction released during formation of said slag, compensated for the heat of reaction which is given off by said other elements in areas away from the region of said molten steel, means for producing a third signal representing the sensible heat lost as latent heat of the carbon monoxide and carbon dioxide in the exhaust gases from said refining, said third signal being produced by modifying said carbon-loss signal, means for producing a fourth signal indicative of the heat losses from the refining vessel, means for algebraically summing and integrating said first, second, third and fourth signals, and means for dividing the resulting signal produced by said last named means in accordance with a value representing the weight of molten steel being refined to obtain a signal indicative of the temperature of said molten steel.

6. Apparatus for inferentially establishing a signal indicative of the temperature of the molten steel being refined by a process which introduces high purity oxygen comprising means for producing a signal indicative of the differential pressure between two points in the exhaust system of said process said signal being representative of the flow of exhaust gases from said process, means for producing a signal indicative of the temperature of said exhaust gases, means for dividing said differential pressure signal by said temperature signal and extracting the square root of the resultant signal to thereby produce a signal indicative of the total flow of exhaust gases from said process, means for producing a signal indicative of the concentration of carbon dioxide in said exhaust gases on a dry gas basis, means for comparing said temperature signal and said carbon dioxide signal and adding the result of said comparison to a constant value to produce thereby a signal indicative of the ratio of the dry gas to the wet gas in said exhaust system, means for multiplying said total flow signal and said ratio signal to produce a signal indicative of the flow of dry gas in said exhaust system, means for multiplying said dry gas flow signal and said carbon dioxide concentration signal to establish a signal indicative of the carbon-loss rate from said process, means for producing a signal indicative of the differential pressure across a restriction in the feed line for the high purity oxygen fed to said process, means for producing a signal indicative of the static pressure in said oxygen feed line, means for multiplying said differential pressure and said static pressure signals for said oxygen line and extracting the square root of the product to establish a signal indicative of the flow of oxygen into said process, means for producing from said carbon-loss rate signal a signal for establishing compensation for the carbon dioxide made in the region of the bath, means for comparing said carbon-loss rate signal and said oxygen flow signal and for modifying the result of said comparison in accordance with said carbon dioxide compensation signal to produce a signal indicative of the slag formation rate for said process, means for producing from said carbon-loss signal a first signal indicative of the heat released by the reaction of carbon and oxygen, means for modifying said slag-rate signal to produce a second signal indicative of the amount of heat of reaction released during formation of said slag, compensated for the heat of reaction which is given off by said other elements in areas away from the region of said molten steel, means for producing a third signal representing the sensible heat loss as latent heat of the carbon dioxide in the exhaust gases from said refining, said third signal being produced by modifying said carbon-loss signal, means for producing a fourth signal indicative of the heat losses from the refining vessel, means for algebraically summing and integrating said first, second, third and fourth signals, and means for dividing the resulting signal produced by said last named means in accordance with a value representing the weight of molten steel being refined to obtain a signal indicative of the temperature of said molten steel.

7. Apparatus for inferentially establishing a signal indicative of the temperature of the molten steel being refined by a process which introduces high purity oxygen comprising means for producing a signal indicative of the differential pressure between two points in the exhaust system of said process, said signal being representative of the flow of exhaust gases from said process, means for producing a signal indicative of the temperature of said exhaust gases, means for dividing said differential pressure signal by said temperature signal and extracting the square root of the resultant signal to thereby produce a signal indicative of the total flow of exhaust gases from said process, means for producing a signal indicative of the concentration of carbon dioxide in said exhaust gases, means for producing a signal indicative of the concentration of carbon monoxide in said exhaust gases, means for adding said carbon monoxide signal and said carbon dioxide signal to produce a signal indicative of the concentration of carbon in said exhaust gases, means for multiplying said total gas flow signal and said carbon concentration signal to establish a signal indicative of the carbon loss rate from said process, means for producing a signal indicative of the differential pressure across a restriction in the feed line for the high purity oxygen fed to said process, means for producing a signal indicative of the static pressure in said oxygen feed line, means for multiplying said differential pressure and said static pressure signals for said oxygen line and extracting the square root of the products to establish a signal indicative of the flow of oxygen into said process, means for producing from said carbon-loss rate signal a signal for establishing compensation for the carbon dioxide made in the region of the bath, means for comparing said carbon-loss rate signal and said oxygen flow signal and for modifying the result of said comparison in accordance with said carbon dioxide compensation signal to produce a signal indicative of the slag formation rate for said process, means for producing from said carbon-loss signal a first signal indicative of the heat released by the reaction of carbon and oxygen, means for modifying said slag-rate signal to produce a second signal indicative of the amount of heat of reaction released during formation of said slag, means for producing a third signal representing the sensible heat lost as latent heat of the carbon monoxide and carbon dioxide in the exhaust gases from said refining, said third signal being produced by modifying said carbon-loss signal, means for producing a fourth signal indicative of the heat losses from the refining vessel, means for modifying said oxygen flow signal to produce a fifth signal indicative of that portion of the heat of reaction given off by the combination of said other elements with oxygen in areas away from said molten steel, means for modifying said carbon loss-rate signal to produce a sixth signal indicative of the additional heat given up to the molten steel as a result of the formation of carbon dioxide in the region of said steel, means for algebraically summing and integrating said first, second, third, fourth, fifth and sixth signals, and means for dividing the resulting signal produced by said last named means in accordance with a value representing the weight of molten steel being refined to obtain a signal indicative of the temperature of said molten steel.

8. In a process for the refining of steel by the introduction of high purity oxygen, the steps of producing a signal indicative of the carbon-loss rate resulting from the combination of carbon from said steel with said high purity oxygen in the region of said molten steel, producing from said carbon-loss signal a first signal indicative of the heat released by the reaction of carbon and oxygen, producing a slag-rate signal indicative of the rate at which slag is formed by the combination of elements other than carbon from said steel with said oxygen, modifying said slag-rate signal to produce a second signal indicative of the amount of heat of reaction released during formation of said slag, and producing a signal indicative of the temperature of said molten steel by algebraically summing and integrating said first and second signals.

No references cited.

MALCOLM A. MORRISON, *Primary Examiner.*

JOSEPH F. RUGGIERO, *Assistant Examiner.*

U.S. Cl. X.R.

235—151.1